US008001075B2

(12) United States Patent
Doty et al.

(10) Patent No.: US 8,001,075 B2
(45) Date of Patent: Aug. 16, 2011

(54) LOG FILE AMNESIA DETECTION

(75) Inventors: John D Doty, Seattle, WA (US); Craig A Critchley, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 416 days.

(21) Appl. No.: 11/756,974

(22) Filed: Jun. 1, 2007

(65) Prior Publication Data

US 2008/0301200 A1 Dec. 4, 2008

(51) Int. Cl.
*G06F 17/30* (2006.01)
*G06K 5/04* (2006.01)

(52) U.S. Cl. ........ 707/609; 707/672; 707/674; 707/675; 707/685; 714/4; 714/38; 714/38.1

(58) Field of Classification Search ................ 707/609, 707/672, 674, 675, 685, 821, 640–654; 714/4, 714/38
See application file for complete search history.

(56) References Cited

U.S. PATENT DOCUMENTS

| | | | |
|---|---|---|---|
| 5,504,883 A * | 4/1996 | Coverston et al. | 707/202 |
| 5,638,508 A | 6/1997 | Kanai et al. | |
| 5,832,518 A * | 11/1998 | Mastors | 707/202 |
| 5,890,154 A * | 3/1999 | Hsiao et al. | 707/8 |
| 5,951,695 A | 9/1999 | Kolovson | |
| 6,073,128 A * | 6/2000 | Pongracz et al. | 707/3 |
| 6,178,427 B1 * | 1/2001 | Parker | 707/202 |
| 6,574,627 B1 | 6/2003 | Bergadano et al. | |
| 6,910,159 B2 * | 6/2005 | Phillips et al. | 714/38 |
| 6,950,832 B2 | 9/2005 | Brown et al. | |
| 7,076,508 B2 | 7/2006 | Bourbonnais et al. | |
| 7,143,120 B2 | 11/2006 | Oks et al. | |
| 7,174,345 B2 * | 2/2007 | Malaney et al. | 707/102 |
| 2002/0007363 A1 | 1/2002 | Vaitzblit | |
| 2003/0033554 A1 * | 2/2003 | Bomfim et al. | 714/4 |

(Continued)

FOREIGN PATENT DOCUMENTS

WO WO9623258 A1 8/1996

OTHER PUBLICATIONS

NIGELOG: Protecting Logging Information by Hiding Multiple Backups in Directories http://citeseer.ist.psu.edu/cache/papers/cs/20210/http:zSzzSzwww.vogue.is.uec.ac.jpzSz~zetakazSzPubliczSzkenkyuzSzpaperszSz99iwecs.pdf/takada99nigelog.pdf, Feb. 2, 2010.

(Continued)

*Primary Examiner* — Frantz Coby
(74) *Attorney, Agent, or Firm* — Merchant & Gould P.C.

(57) ABSTRACT

Log file amnesia detection is accomplished by associating a unique identifier with each record in a log file, where each record receives a unique log sequence number. Multiple time intervals are associated with the log file with different events triggering the beginning of a new time interval. The log file implementation marks the beginnings of these multiple time intervals with a unique identifier. Every time an event occurs that triggers a new time interval a new unique identifier is generated. This unique identifier will be associated with the records in the log file that are created thereafter until the next unique identifier gets generated, marking the beginning of a next time interval. Log file amnesia can be identified when a log client requests information about a record and then comparing the unique identifier and log sequence number of the record with all records in the log file.

32 Claims, 5 Drawing Sheets

U.S. PATENT DOCUMENTS

2003/0159088 A1*  8/2003  Phillips et al. .................. 714/38
2003/0182552 A1   9/2003  Tanimoto et al.
2003/0236766 A1* 12/2003  Fortuna et al. .................... 707/1
2005/0149750 A1   7/2005  Lisanke et al.
2006/0075277 A1*  4/2006  Johnson et al. ................... 714/4

OTHER PUBLICATIONS

Real-Time Log File Analysis Using the Simple Event Correlator (SEC) http://www.cs.umb.edu/~rouilj/sec/sec_paper_full.pdf, Nov. 2004.

* cited by examiner

| LSN 0 | LSN 1 | LSN 2 | LSN 3 | LSN 4 | LSN 5 |
|---|---|---|---|---|---|
| UID A | UID A | UID A | UID A | UID A | UID A |

BACKED UP REGION

FIG. 1A

| LSN 0 | LSN 1 | LSN 2 | LSN 3 | LSN 4 | LSN 5 | LSN 6 | LSN 7 | LSN 8 |
|---|---|---|---|---|---|---|---|---|
| UID A | UID A | UID A | UID A | UID A | UID A | UID A | UID A | UID A |

BACKED UP REGION     ADDITIONAL RECORDS

FIG. 1B

| LSN 0 | LSN 1 | LSN 2 | LSN 3 | LSN 4 | LSN 5 | LSN 6 | LSN 7 | LSN 8 |
|---|---|---|---|---|---|---|---|---|
| UID A | UID A | UID A | UID A | UID A | UID A | UID A | UID A | UID A |

RESTORED FROM BACKUP REGION     LOST (AMNESIA)

FIG. 1C

| LSN 0 | LSN 1 | LSN 2 | LSN 3 | LSN 4 | LSN 5 | LSN 6' | LSN 7' | LSN 8' |
|---|---|---|---|---|---|---|---|---|
| UID A | UID A | UID A | UID A | UID A | UID A | UID B | UID B | UID B |

RESTORED FROM BACKUP REGION     NEW RECORDS

FIG. 1D

| LSN 0" | LSN 1" | LSN 2" | LSN 3" | LSN 4" |
|---|---|---|---|---|
| UID C | UID C | UID C | UID C | UID C |

NEW RECORDS AFTER RESET

| LSN 0 UID A | LSN 1 | LSN 2 | LSN 3 | LSN 4 | LSN 5 |

| LSN 0 UID A | LSN 1 | LSN 2 | LSN 3 | LSN 4 | LSN 5 | LSN 6 | LSN 7 | LSN 8 |

202 — BACKED UP REGION | ADDITIONAL RECORDS

FIG. 2C

| LSN 0 UID A | LSN 1 | LSN 2 | LSN 3 | LSN 4 | LSN 5 | LSN 6 | LSN 7 | LSN 8 |

202 — RESTORED FROM BACKUP REGION | LOST (AMNESIA)

FIG. 2D

| LSN 0 UID A | LSN 1 | LSN 2 | LSN 3 | LSN 4 | LSN 5 | LSN 6' UID B | LSN 7' | LSN 8' |

202 — RESTORED FROM BACKUP REGION | 204 — NEW RECORDS

FIG. 2E

| LSN 0" UID C | LSN 1" | LSN 2" | LSN 3" | LSN 4" |

206 — NEW RECORDS AFTER RESET

LOG FILE AMNESIA DETECTION

BACKGROUND

A computer file that records actions that have occurred is commonly referred to as a log file. A log file represents a durable and consistent recording of all the work that was done during a single continuous time interval. Log files may be text files, binary files, or data files (stateful or stateless). For example, servers typically maintain log files listing every request made to the server. Web servers maintain log files containing a history of page requests. By utilizing log analysis software/log file analysis tools, referred to as log clients, it is possible, for example, to get a good idea of where visitors to a web site are coming from, how often they return, and how they navigate through a web site. Many other applications, such as transaction managers, queue managers, and databases also use log files to track work done. Log clients may be designed to interact with the log files for different purposes for a particular application.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Sometimes events occur that result in a loss of records in a log file about the work done during some time interval due to administrative actions, hardware related issues, or other causes. For example, an administrator restoring a log from a backup system might lose records regarding work done beginning from the time that the backup was created and ending at the time of the restoration of the log file from the backup. Or, hardware problems may cause records that should be in the middle of the log from being recorded. In addition, there is no way to include in a log file records about work that was done before the log file was created.

In all of these scenarios, there is work that was done that the log file contains no information about. This is called "log file amnesia." The ability to identify log file amnesia no matter what the scenario that occurred is of paramount importance.

By convention, typically each record in a log file is marked using a log sequence number ("LSN"), identifying the order in which the records were written to the log file. Also, references to the records in the log file are typically annotated with the time of the log's creation, referred to as the log's "birthday." Log files will typically "live" as long as the state they describe exists. For example, this may be as long as a database exists, or as long as the current operating system is installed. Thus, there is usually only one time interval associated with a log file, the time spanning from its creation to its demise.

In order to detect log file amnesia, two steps are taken. First, a unique identifier is associated with each record along with the log sequence number for the record. The log sequence numbers that are used in a log file are unique in that log file. They identify the log record, and are independent of the number of different time intervals or which time interval the record was written. The way in which log sequence number are generated is well known in the art and is not discussed further here. The generation of log sequence numbers will vary based on the implementation of the underlying log file. Generating the unique identifiers requires very little storage to implement.

Second, instead of assigning a "birthday" to a log file, multiple time intervals are associated with the log file with different events triggering the beginning of a new time interval. To do this, the log file implementation marks the beginnings of these multiple time intervals with a unique identifier. Every time an event occurs that triggers a new time interval a new unique identifier is generated. This unique identifier will be associated with every record in the log file that is created thereafter until the next unique identifier gets generated, marking the beginning of a next time interval. Even in situations where the entire log file becomes incorrect due to administrative actions or hardware failures, log file amnesia can be identified by using a combination of these unique identifiers and log sequence numbers associated with all the records in the log file.

BRIEF DESCRIPTION OF THE SEVERAL VIEWS OF THE DRAWINGS

FIGS. 1A-1E show a graphic depiction of a log file in one embodiment.

FIGS. 2A-2E show a graphic depiction of a log file in another embodiment.

DETAILED DESCRIPTION

Figure 3:
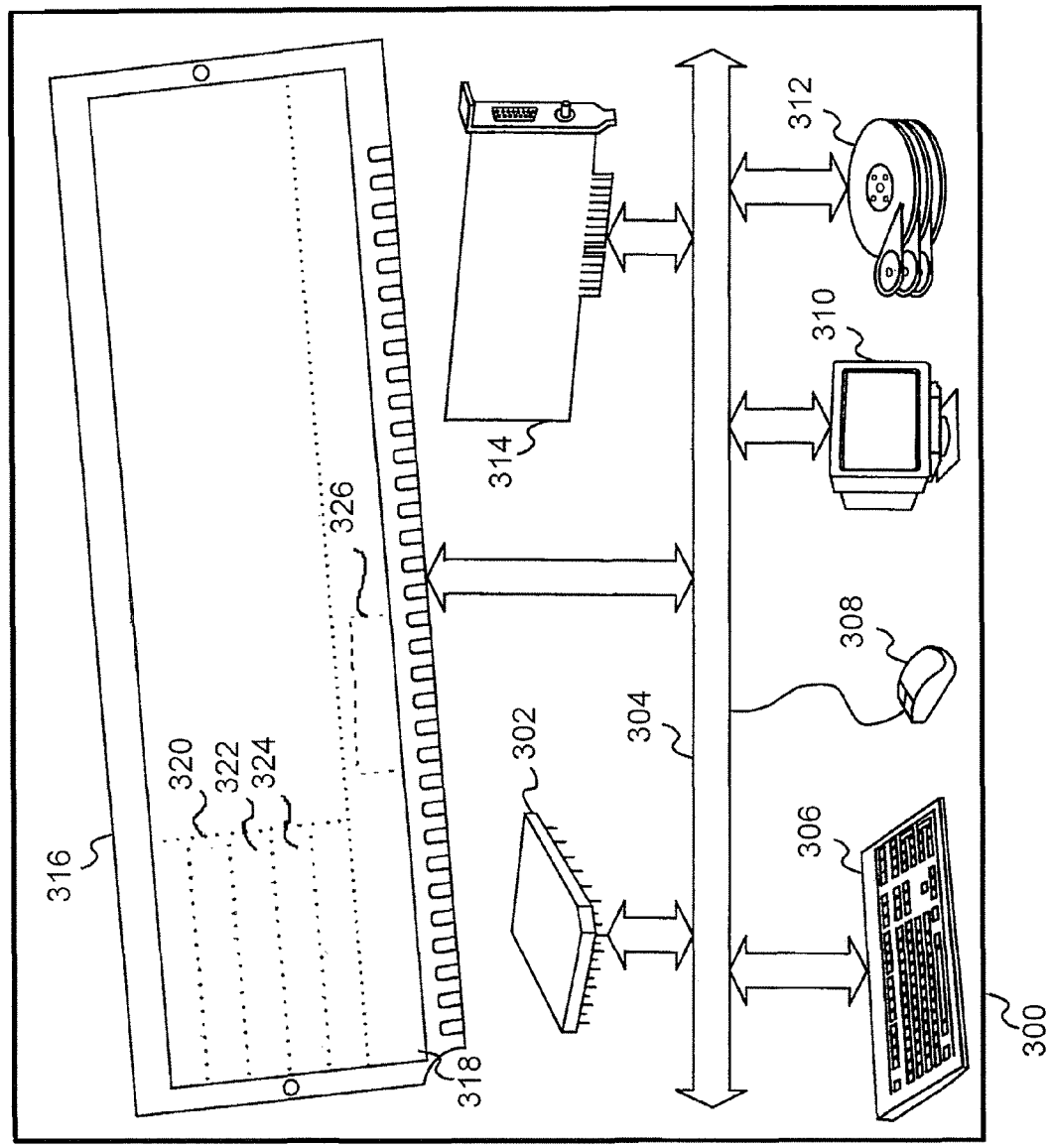
FIG. 3 shows a schematic/block diagram of a stand alone computer system implementing log file amnesia detection.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

One of the most common causes for log file amnesia is resetting the log file. This means that the log file gets deleted and then recreated, losing all the recorded information about any work that was done. This can cause severe problems. For example, transaction management systems rely on log file data integrity to provide guarantees about the consistency of their transactions.

This particular scenario has a fairly well-known and straightforward solution. References to the records in the log file can be annotated with the time of the log file's creation, referred to as the log file's "birthday." When a log client associated with an application using the log receives a reference to a record in the log file, it compares the timestamp contained in the reference to the log file's "birthday." If the current log file's birthday is newer than the timestamp that is associated with the reference to the log file, then the log client knows that the log file has been reset in between the time the reference to the record was handed out and now. That is, the log client can detect that this is an instance of log file amnesia, and it can react in a suitable manner.

However, this approach does not provide a solution for other scenarios. One such scenario is a restoration of the log file from a backup copy. In this scenario, the log file containing records 1 to n is backed up. Additional records after the back up are added to the log file (records n+1 to n+x) until an adverse incident occurs which requires the restoration of the last backed up copy of the log file. After restoration of the log file, the last records from the end of the log file that were added after the backup was made (records n+1 to n+x) are lost, resulting in log file amnesia. New records are now added to the restored log file (n+1' to n+x'). Since the original additional records (n+1 to n+x) and the new additional records (n+1' to n+x') all have the same "birthday" the above approach will not reveal that log file amnesia has occurred.

Referring now to the Figures, in which like reference numerals and names refer to structurally and/or functionally similar elements thereof, FIGS. 1A-1E show a graphic depiction of a log file in one embodiment. Referring now to FIG. 1A, a log file is created by a log file implementation, and a unique identifier (UID A) for a first time interval is generated. Any arbitrary unique identifier may be used. For example, there are algorithms for generating globally unique 16-byte (128-bit) numbers called GUIDs (Globally Unique Identifier) that are suitable for this purpose. However, any other means of generating a unique identifier may be used. For example, a suitable software module built into the log file implementation or in the operating system may be used to generate a 32-bit or 64-bit timestamp.

The first record in the log file is assigned an LSN (LSN 0) and is annotated with UID A. Each subsequent record generated is assigned a sequential LSN number that is also annotated with UID A. After record LSN 5 is created, the log file is backed up to durable storage, forming the Backed Up Region set of records shown. After the backup is done, there is additional activity which causes a set of three new records to be added to the log file: LSN 6, LSN 7, and LSN 8 shown as Additional Records in FIG. 1B. These three Additional Records are annotated using UID A, since these three Additional Records belong to the first time interval.

In FIG. 1C, a restoration from backup is performed. The Restored From Backup Region set of records shown contains records LSN 0 through LSN 5. However, in the restoration process, the three records added to the log file since the backup (LSN 6 through LSN 8) are lost, shown in FIG. 1C with dashed lines as Lost (Amnesia). Performing restoration from backup is an event that triggers the creation of a new unique identifier for the beginning of a next time interval. A unique identifier (UID B) for this next time interval is generated. As new work is done additional records are created and assigned LSNs (LSN 6', LSN 7', and LSN 8') which are each annotated with UID B and added to the log file as shown in FIG. 1D as the set of New Records. Note that the global log sequence numbers would still be 6, 7, and 8. LSN 6' is used to indicate that the record is for a different activity than LSN 6. The New Records are annotated with the new identifier (UID B) since these were added to the log file after the creation of the new time interval.

The log "birthday" approach described above cannot identify this log file amnesia situation since the log client cannot tell the difference between records LSN 6 and LSN 6'. The "birthday" of the log file in the approach described above did not change, and so LSN 6 and LSN 6' appear to be identical because they have identical LSNs and the same "birthday." However, by annotating each record with a unique identifier, UID A and UID B, based upon the different time intervals involved, the log client is able to tell the difference between LSN 6 and LSN 6' since their unique identifier is different. This approach allows detection of log file amnesia due to restoration of a log file from backup because the unique identifier of every time interval started since the backup was restored will be different from any unique identifier generated before the backup was taken.

Assume now after the creation of record LSN 8' that the log file has to be completely reset. This also is an event that triggers the creation of a new unique identifier for the beginning of a next time interval. A unique identifier (UID C) for this next time interval is generated. As new work is done an additional set of records are created and assigned LSNs (LSN 0", LSN 1", LSN 2", LSN 3", and LSN 4") which are each annotated with UID C and shown in FIG. 1E as New Records After Reset. Now, any references to records LSN 0-LSN 8 annotated with UID A and records LSN 6'-LSN 8' annotated with UID B will be identified as log file amnesia since all references to LSN 0-LSN 4 should be annotated with UID C, and there are no records at all in the log file at this time associated with LSN 5-LSN 8. Thus, detection of log file amnesia due to the complete reset of the log file is possible because every unique identifier in the reset log file will be different from any of the unique identifiers that were in the log file before it was reset.

A log client may perform many different operations on a log file including: (1) read some record as identified by a log sequence number; (2) append a new record and receive back the log sequence number assigned; and (3) force the log file to be written to durable storage. The log client does not need to know about the structure of the LSNs. As far as the log client knows, the LSN is just a handle to an object that it gets back. Therefore, when the log file implementation is part of the operating system and it includes the LSN/UID functionality, any existing log client associated with an application will be able to receive all of the benefits of this approach to detecting log file amnesia. The functionality is built into the log file implementation itself and not individual log clients. Thus, any application with a log client could utilize this way of detecting log file amnesia so long as the log file implementation has the LSN/UID functionality built in.

When the log file implementation is part of an application, the need to mark the beginning of a new time interval may also be identified by the log file implementation for the application according to its particular design and purpose. All that the application needs to do is to identify all the situations when, in a normal usage scenario, there might have passed periods of time that it does not know the details about. These situations necessarily define the spaces between successive time intervals. For example, a good time to start a new interval is when the log file is created, or as shown above, when restored from a backup copy. At an upper limit an application might go as far as to start a new time interval whenever writing to the log file. Another triggering event could be a computer reboot. All these are valid scenarios and how often and when a new time interval is annotated in the log file is entirely up to the particular application.

Action to be taken when log file amnesia is recognized depends upon the application and each particular situation, which is highly context dependent. The only commonality is that it is generally not something that the processing system can recover from on its own. Once log file amnesia is detected, the processing system typically cannot make any further forward progress, and human intervention is usually required. When an application reads or retrieves a record with a LSN/UID pair, and a comparison is made with the log file, and there is no recognition of the record indicating log file amnesia, what happens next depends upon the particular application.

In typical operation the log client will make a request to the log file implementation, and the log file implementation would fail the request with some sort of returned distinguished error message that says the request failed because log file amnesia was detected. For example, a database may be failing upon recovery, or while running, or a transaction manager or a queue manager encounters a problem when the log client request is made. The actual error message returned is really highly dependent upon what the overall context of the operation was. The operations should be at low enough levels that it is not possible to tell what was actually happening when log file amnesia was detected, such as adding a new customer record, for example. So the log client request of some operation from the log file implementation will be returned with a confirmation of the operation or a non-confirmation of the operation. The non-confirmation response can have many different reasons, one of them being that a comparison step of the record in hand with the records in the log file failed, indicating log file amnesia. Generally speaking, processing systems should stop and refuse to do anything else when log file amnesia is detected. Log file amnesia is an indication that something went wrong, and most processing systems will stop because going forward could potentially cause more damage. When the log file amnesia error message is received, usually a human has to decide what action to take. Log file amnesia indicates that some data is missing, and a human operator needs to look into the matter to try and determine what data is missing, why it is missing, and what steps to take, if any are possible, to recover the missing data.

FIGS. 2A-2E show a graphic depiction of a log file in another embodiment. The embodiment described above in relation to FIGS. 1A-1E may be somewhat cumbersome on the log, as it needs to record the unique identifier for each time interval with every record. This can be viewed as a waste of space. Log records are generally kept as small as possible, because otherwise, appending to the log may become a bottleneck for the log client.

Therefore, instead of appending the unique identifier for each time interval to each record, it is sufficient for a log implementation to append a single record which marks the beginning of the interval and records the unique identifier for that interval. The unique identifier associated with any given record/LSN can then be determined by scanning backwards through the log until one of these "begin interval" records is found. This "begin interval" record then indicates the interval identifier for the record in question.

However, this would be a de-optimization of the append request process if it were actually performed as described above. Fortunately, there is an easy optimization. A log implementation may simply store the identifier of the current interval in main memory rather than scanning backwards to find it for the append request process.

Referring now to FIGS. 2A-2E, the same scenario described in reference to FIGS. 1A-1F applies to this embodiment, except that only the "begin interval" record is annotated with the unique identifier for each new time interval. Record 202 (LSN 0, UID A) is the "begin interval" record associated with the Backed Up Region of records in FIGS. 2A and 2B and the Restored From Backup Region of records in FIGS. 2C and 2D. Record 204 (LSN 6', UID B) is the "begin interval" record associated with the New Records region of records in FIG. 2D. Record 206 (LSN 0", UID C) is the "begin interval" record associated with the New Records After Reset region of records in FIG. 2E.

FIG. 3 shows a schematic/block diagram of a stand alone computer system implementing log file amnesia detection. Besides a stand alone personal computer system, the log file amnesia detection may also be implemented on a mainframe computer system, a networked distributed computer system, a hand held computing device, or any other suitable processing system. The computer system shown in FIG. 3 is just one of many different embodiments possible.

Referring now to FIG. 3, a Computer System 300 contains a Processing Element 302. The Processing Element 302 communicates to other elements of the Computer System 300 over a System Bus 304. A Keyboard 306 allows a user to input information into Computer System 300, and a Graphics Display 310 allows Computer System 300 to output information to the user. Graphics Display 310 may also be touch screen enabled, allowing a user to input information into Computer System 300 through this mode. Graphical Input Device 308, which may be a mouse, joy stick, or other type of pointing device, is also used to input information. A Storage Device 312 is used to store data and programs within Computer System 300. A Memory 316, also connected to System Bus 304, contains an Operating System 318, and Application Software 320 having Log Client 322 running in the memory. In one embodiment, Log File Implementation 324 may be incorporated into Application Software 320. In another embodiment, Log File Implementation 326 is incorporated within Operating System 318 instead of within Application Software 320. Log Client 322 would then access Log File Implementation 326 from Operating System 318. A Communications Interface 314 is also connected to System Bus 304. Communications Interface 314 may have one or more serial ports, parallel ports, infrared ports, and the like. Connectable through Communications Interface 314 may be an external printer or scanner, as well as access to a computer network (LAN or WAN), to the Internet, or to any other appropriate communication channel (not shown in FIG. 3).

Figure 4:
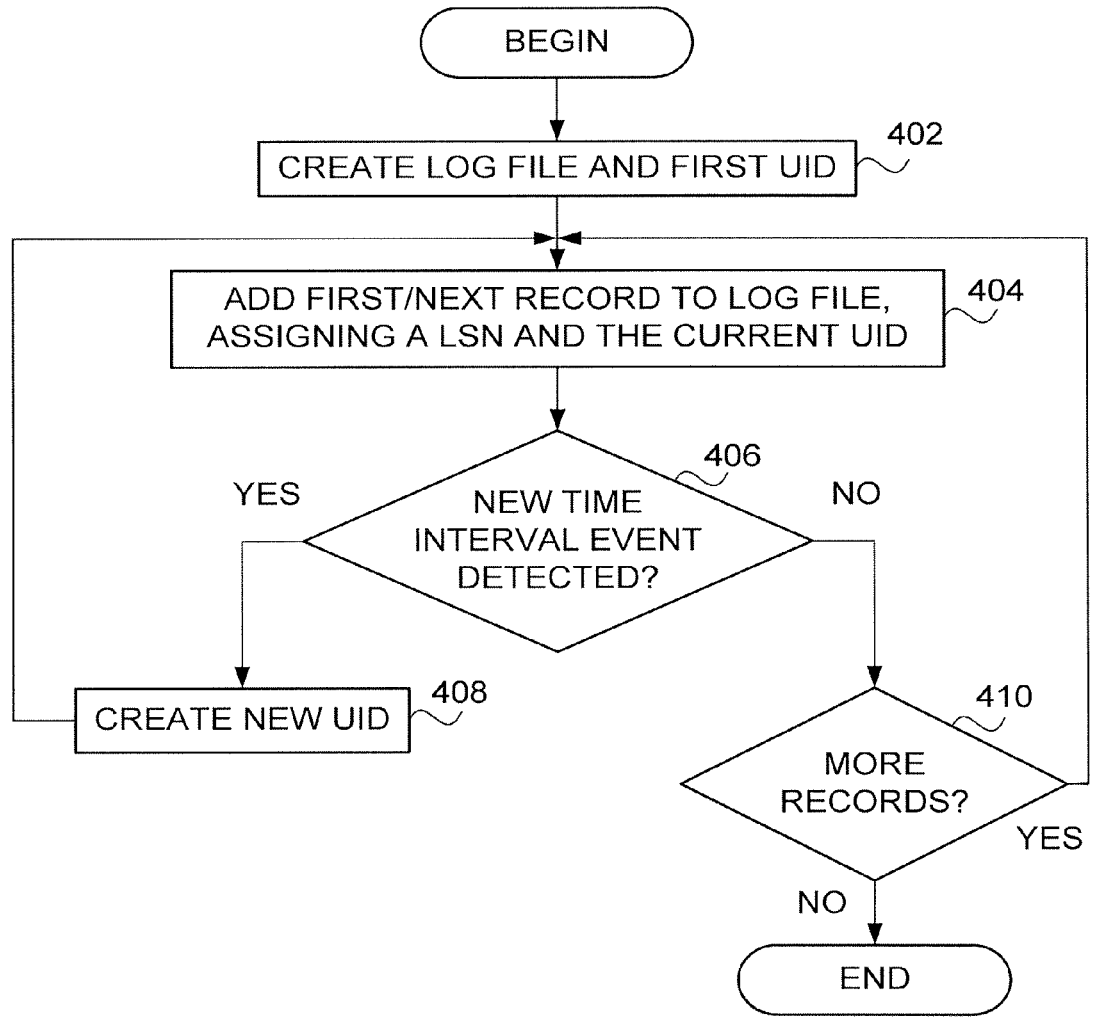
FIG. 4 shows a block flow diagram for storing records in a log file to enable log file amnesia detection.

FIG. 4 shows a block flow diagram for storing records in a log file to enable log file amnesia detection. Referring now to FIG. 4, a log file and a unique identifier (UID) for a first time interval are created in step 402. In step 404, a first record is written to the log file and a sequential LSN is assigned to the record and annotated with the current UID for the embodiment shown in FIGS. 1A-1E. Otherwise, for the embodiment shown in FIGS. 2A-2E, only the first record is annotated with the current UID, and the current UID is stored in memory.

Step 406 determines if an event is detected that has been defined to be the beginning of a new time interval. If such a triggering event is detected, then in step 408 a new UID is created and control returns to step 404 where the next record added to the log file will be annotated with the new UID and the next sequential LSN. If no such event is detected in step 406, then step 410 determines if there are more records to be appended to the log file. If yes, control returns to step 404 where the next record added to the log file will be assigned the next sequential LSN and annotated with the current UID for the embodiment shown in FIGS. 1A-1E. Otherwise, for the embodiment shown in FIGS. 2A-2E, the next record is only assigned the next sequential LSN and is not annotated with the current UID. If there are no more records to append to the log file in step 410, the method ends.

Figure 5:
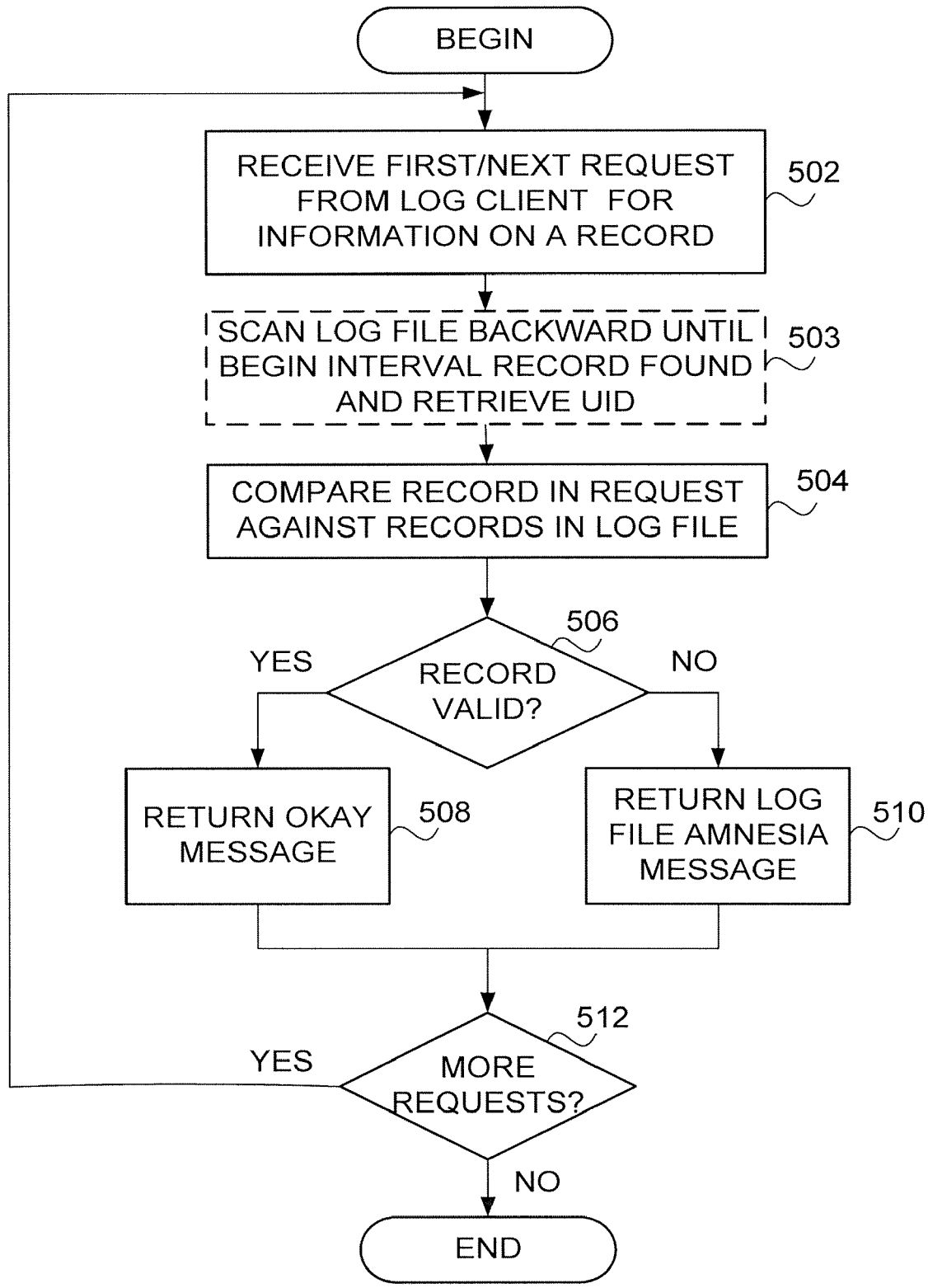
FIG. 5 shows a block flow diagram of a log file implementation detecting log file amnesia.

FIG. 5 shows a block flow diagram of a log file implementation detecting log file amnesia. Referring now to FIG. 5, in step 502 a request is received from a log client for validation of a record in the log file. For the embodiment shown in FIGS. 2A-2E, the log file implementation in additional step 503 (shown in dashed-line) will read the log file beginning at the LSN of the record in question and scan backward until a "begin interval" record is found. The unique identifier is read from the "begin interval" record to form the LSN/UID pair. For the embodiment shown in FIGS. 1A-1E, step 503 is of course not performed.

Next, the log file implementation in step 504 compares the LSN/UID for the record from the request against the LSN/UID information stored for all the sets of records in the log file. Step 506 determines if there is a match between the requested record and a record in the log file. A match (the LSN/UID of the requested record matches a LSN/UID record in the log file) indicates that the record is valid. If there is a match, then in step 508 the log file implementation returns an okay message to the log client and control flows to step 512.

If step 506 determines that there is no match, then in step 510 the log file implementation returns a log file amnesia message to the log client. Control then flows to step 512.

Step 512 determines if there are more requests from the log client for information on records in the log file. If yes, control returns to step 502. If there are no more requests from the log client, then the method ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications of the invention will suggest themselves without departing from the scope of the present invention.

What is claimed is:

1. A method for operation of a computer for detecting log file amnesia, the computer including a processor and a memory, a log file implementation and a log client running in the memory, the method comprising the steps of:
   (a) creating by the log client implementation a log file and a first unique identifier indicating a first time interval for the log file, wherein the first unique identifier is appended to a first beginning interval record of the first time interval which marks the beginning of the first time interval;
   (b) writing a first set of one or more records to the log file, wherein a first record of the one or more records is assigned a sequential log sequence, and wherein the first set of one or more records is associated with the first unique identifier;
   (c) detecting by the log client implementation a first defined triggering event indicating a beginning of a next time interval for the log file, wherein the next time interval is used to record the writing of a next set of one or more records after writing the first set of one or more records;
   (d) creating a next unique identifier indicating the next time interval for the log file, wherein the next unique identifier is appended to a second beginning interval record of the next time interval which marks the beginning of the next time interval;
   (e) writing the next set of one or more records to the log file, wherein each of the one or more records is assigned the sequential log sequence number, and wherein the next set of one or more record is associated with a unique identifier;
   (f) receiving a request from the log client for validation of a record, wherein the record received from the log client has a log sequence number and a unique identifier;
   (g) comparing the log sequence number and the associated unique identifier for the record against the first unique identifier and the next unique identifier;
   (h) when the match is found, returning an okay message; and
   (i) when the match is not found, returning a log file amnesia message to the log client that indicates a missing set of one or more records written to the log file but no longer stored within the log file.

2. The method according to claim 1 wherein the creating step (a) and the creating step (d) each further comprise at least one of the steps of:
   using an algorithm to generate a 16-byte (128-bit) globally unique identifier for the first unique identifier and the next unique identifier;
   generating a 64-bit timestamp; or
   generating a 32-bit timestamp.

3. The method according to claim 1 wherein the detecting step (c) further comprises the step of:
   detecting at least a one of a creation of the log file, a reset of the log file, a restoration of the log file from a backup, a writing of a record to the log file, computer reboot, or a second defined triggering event.

4. The method according to claim 1 further comprising the when the match is found, returning an okay message to the log client.

5. The method according to claim 1 further comprising the step of:
   running the log file implementation from within an operating system of the computer.

6. The method according to claim 1 further comprising the step of:
   running the log file implementation from within an application running in the memory of the computer.

7. The method according to claim 1 further comprising the step of:
   running the log client from within an application running in the memory of the computer.

8. A computer system for detecting log file amnesia, the system comprising:
   a processor;
   a memory accessible by the processor;
   a log file implementation running in the memory;
   a log client running in the memory; and
   a log file created by the log file implementation, wherein the log file has:
   a first unique identifier indicating a first time interval for the log file, and a first set of one or more records, wherein a first beginning interval record of the one or more records is assigned a sequential log sequence number and is annotated with the first unique identifier;
   a first defined triggering event;
   when the first defined triggering event is detected by the log file implementation, a next unique identifier indicating a next time interval for the log file is appended to a second beginning interval record, and associated with a next set of one or more records, wherein the next time interval is used to record the writing of the next set of one or more records after writing the first set of one or more records, wherein each of the one or more records is assigned the sequential log sequence number and is associated with the next unique identifier, and wherein the next time interval is used to indicate that a next set of one or more records was created after the log file was restored from backup; and
   a log file amnesia message, wherein the log client implementation receives requests from the log client for validation of one or more records, wherein each of the one or more records received from the log client has a log sequence number and a unique identifier, and the log client implementation compares the log sequence number and the unique identifier associated with each of the one or more records against the first set of one or more records and the next set of one or more records to determine if there is a match, and when the match is not found, the log client implementation returns the log file amnesia message to the log client that indicates a missing set of one or more records written to the log file but no longer stored within the log file.

9. The system according to claim 8 further comprising at least a one of:
an algorithm for generating a 16-byte (128-bit) globally unique identifier for the first unique identifier and the next unique identifier;
a software module for generating a 32-bit timestamp; or
a software module for generating a 64-bit timestamp.

10. The system according to claim 8 wherein the defined triggering event is at least a one of a creation of the log file, a reset of the log file, a restoration of the log file from a backup, a writing of a record to the log file, computer reboot, or a second defined triggering event.

11. The system according to claim 8 further comprising:
an okay message, wherein when the match is found, the log client implementation returns the okay message to the log client.

12. The system according to claim 8 further comprising:
an operating system of the computer, wherein the log file implementation runs from within the operating system.

13. The system according to claim 8 further comprising:
an application running in the memory of the computer, wherein the log file implementation and the log client run from within the application.

14. A tangible computer readable storage medium storing instructions that, when executed by a processor, cause the processor to perform a method for detecting log file amnesia, the method comprising the steps of:
(a) creating a log file and a first unique identifier indicating a first time interval for the log file, wherein the first unique identifier is appended to a first beginning interval record of the first time interval which marks the beginning of the first time interval;
(b) writing a first set of one or more records to the log file, wherein a first record of the one or more records is assigned a sequential log sequence, and wherein the first set of one or more records is associated with the first unique identifier;
(c) detecting a first defined triggering event indicating a beginning of a next time interval for the log file, wherein the next time interval is used to record the writing of a next set of one or more records after writing the first set of one or more records;
(d) creating a next unique identifier indicating the next time interval for the log file, wherein the next unique identifier is appended to a second beginning interval record of the next time interval which marks the beginning of the next time interval;
(e) writing the next set of one or more records to the log file, wherein each of the one or more records is assigned the sequential log sequence number, and wherein the next set of one or more record is associated with a unique identifier;
(f) receiving a request for validation of a record, wherein the record received has a log sequence number and a unique identifier;
(g) comparing the log sequence number and the associated unique identifier for the record against the first unique identifier and the next unique identifier;
(h) when the match is found, returning an okay message; and
(i) when the match is not found, returning a log file amnesia message to the log client that indicates a missing set of one or more records written to the log file but no longer stored within the log file.

15. The computer readable storage medium according to claim 14 wherein the creating step (a) and the creating step (d) each further comprise at least one of the steps of:
using an algorithm to generate a 16-byte (128-bit) globally unique identifier for the first unique identifier and the next unique identifier;
generating a 64-bit timestamp; or
generating a 32-bit timestamp.

16. The computer readable storage medium according to claim 14 wherein the detecting step (c) further comprises the step of:
detecting at least a one of a creation of the log file, a reset of the log file, a restoration of the log file from a backup, a writing of a record to the log file, computer reboot, or a second defined triggering event.

17. The computer readable storage medium according to claim 14 further comprising the step of:
when the match is found, returning an okay message to the log client.

18. The computer readable storage medium according to claim 14 further comprising the step of:
running the log file implementation from within an operating system of the computer.

19. The computer readable storage medium according to claim 14 further comprising the step of:
running the log file implementation from within an application running in the memory of the computer.

20. The computer readable storage medium according to claim 14 further comprising the step of:
running the log client from within an application running in the memory of the computer.

21. A method for operation of a computer for detecting log file amnesia, the computer including a processor and a memory, and a log file implementation and a log client running in the memory, the method comprising the steps of:
(a) creating by the log client implementation a log file and a first unique identifier indicating a first time interval for the log file, wherein the first unique identifier is stored in the memory;
(b) writing a first set of one or more records to the log file, wherein a first record of the one or more records is assigned a sequential log sequence number and a first of the one or more records is annotated with the first unique identifier forming a first begin interval record;
(c) detecting by the log client implementation a first defined triggering event indicating a beginning of a next time interval for the log file, wherein the next time interval is used to record the writing of a next set of one or more records after writing the first set of one or more records;
(d) creating a next unique identifier indicating the next time interval for the log file, wherein the next unique identifier is stored in the memory in place of the first unique identifier;
(e) writing the next set of one or more records to the log file, wherein each of the one or more records is assigned the sequential log sequence number and a first of the one or more records is annotated with the next unique identifier forming a next begin interval record;
(f) receiving a request from the log client for validation of a record, wherein the record received from the log client has a log sequence number;
(g) scanning the log file backward, beginning from the log sequence number for the record, until the first begin interval record or the next begin interval record is found;

(h) reading the first or next unique identifier from the first begin interval record or the next begin interval record found, forming a log sequence number/unique identifier pair for the record;

(i) comparing the log sequence number/unique identifier pair determined for the record against the first set of one or more records and the next set of the one or more records to determine if there is a match; and (j) when the match is not found, returning a log file amnesia message to the log client that indicates a missing set of one or more records written to the log file but no longer stored within the log file.

22. The method according to claim 21 wherein the creating step (a) and the creating step (d) each further comprise at least one of the steps of:
using an algorithm to generate a 16-byte (118-bit) globally unique identifier for the first unique identifier and the next unique identifier;
generating a 64-bit timestamp; or
generating a 32-bit timestamp.

23. The method according to claim 21 wherein the detecting step (c) further comprises the step of:
detecting at least a one of a creation of the log file, a reset of the log file, a restoration of the log file from a backup, a writing of a record to the log file, computer reboot, or a second defined triggering event.

24. The method according to claim 21 further comprising the step of:
when the match is found, returning an okay message to the log client.

25. A computer system for detecting log file amnesia, the system comprising:
a processor;
a memory accessible by the processor;
a log file implementation running in the memory;
a log client running in the memory; and
a log file created by the log file implementation, wherein the log file has: a first unique identifier indicating a first time interval for the log file, wherein the first unique identifier is appended to a first beginning interval record of the first time interval which marks the beginning of the first time interval, and
a first set of one or more records, wherein each of the one or more records is assigned a sequential log sequence number and a first of the one or more records is annotated with said first unique identifier forming a first begin interval record, and said first unique identifier is stored in the memory;
a first defined triggering event;
when the first defined triggering event is detected by said log file implementation, a next unique identifier indicating a next time interval for said log file, and a next set of one or more records, wherein the next time interval is used to record the writing of the next set of one or more records after writing the first set of one or more records wherein each of the one or more records is assigned the sequential log sequence number and a first of the one or more records is annotated with the next unique identifier forming a next begin interval record, wherein the next unique identifier is stored in the memory in place of the first unique identifier; and
a log file amnesia message, wherein the log client implementation receives requests from the log client for validation of the one or more records, wherein each of the one or more records received from the log client has a log sequence number and a unique identifier obtained by scanning the log file backward, beginning from the log sequence number for the record, until the first begin interval record or the next begin interval record is found, forming a log sequence number/unique identifier pair for the one or more records, and the log client implementation compares the log sequence number/unique identifier pair for each of the one or more records against the first set of one or more records and the next set of one or more records to determine if there is a match, and when the match is not found, the log client implementation returns the log file amnesia message to the log client that indicates a missing set of one or more records written to the log file but no longer stored within the log file.

26. The system according to claim 25 further comprising at least a one of:
an algorithm for generating a 16-byte (128-bit) globally unique identifier for the first unique identifier and the next unique identifier;
a software module for generating a 32-bit timestamp; or
a software module for generating a 64-bit timestamp.

27. The system according to claim 25 wherein the defined triggering event is at least a one of a creation of the log file, a reset of the log file, a restoration of the log file from a backup, a writing of a record to the log file, computer reboot, or a second defined triggering event.

28. The system according to claim 25 further comprising:
an okay message, wherein when the match is found, the log client implementation returns the okay message to the log client.

29. A tangible computer readable storage medium storing instructions that, when executed by a processor, cause the processor to perform a method for detecting log file amnesia, the method comprising the steps of:

(a) creating a log file and a first unique identifier indicating a first time interval for the log file, wherein the first unique identifier is stored in the memory;

(b) writing a first set of one or more records to the log file, wherein a first record of the one or more records is assigned a sequential log sequence number and a first of the one or more records is annotated with the first unique identifier forming a first begin interval record;

(c) detecting a defined triggering event indicating a beginning of a next time interval for the log file, wherein the next time interval is used to record the writing of a next set of one or more records after writing the first set of one or more records;

(d) creating a next unique identifier indicating the next time interval for the log file, wherein the next unique identifier is stored in the memory in place of the first unique identifier;

(e) writing the next set of one or more records to the log file, wherein each of the one or more records is assigned the sequential log sequence number and a first of the one or more records is annotated with the next unique identifier forming a next begin interval record;

(f) receiving a request for validation of a record, wherein the record received has a log sequence number;

(g) scanning the log file backward, beginning from the log sequence number for the record, until the first begin interval record or the next begin interval record is found;

(h) reading the first or next unique identifier from the first begin interval record or the next begin interval record found, forming a log sequence number/unique identifier pair for the record;

(i) comparing the log sequence number/unique identifier pair determined for the record against the first set of one or more records and the next set of one or more records to determine if there is a match; and (j) when the match is not found, returning a log file amnesia message to the log client that indicates a missing set of one or more records written to the log file but no longer stored within the log file.

30. The computer readable storage medium according to claim 29 wherein the creating step (a) and the creating step (d) each further comprise at least one of the steps of:

using an algorithm to generate a 16-byte (128-bit) globally unique identifier for the first unique identifier and the next unique identifier;

generating a 64-bit timestamp; or generating a 32-bit timestamp.

31. The computer readable storage medium according to claim 29 wherein the detecting step (c) further comprises the step of:

detecting at least a one of a creation of the log file, a reset of the log file, a restoration of the log file from a backup, a writing of a record to the log file, computer reboot, or a second defined triggering event.

32. The computer readable storage medium according to claim 29 further comprising the step of:

when the match is found, returning an okay message to the log client.

* * * * *